United States Patent
Cyrille et al.

(10) Patent No.: US 7,245,459 B2
(45) Date of Patent: Jul. 17, 2007

(54) CRITICALLY EXPOSED LAPPING OF MAGNETIC SENSORS FOR TARGET SIGNAL OUTPUT

(75) Inventors: Marie-Claire Cyrille, San Jose, CA (US); Ching Hwa Tsang, Sunnyvale, CA (US); Huey-Ming Tzeng, San Jose, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 475 days.

(21) Appl. No.: 10/955,570

(22) Filed: Sep. 30, 2004

(65) Prior Publication Data
US 2006/0067004 A1    Mar. 30, 2006

(51) Int. Cl.
*G11B 5/127* (2006.01)
*B24B 249/00* (2006.01)
(52) U.S. Cl. .......................... 360/316; 451/8
(58) Field of Classification Search ............... 360/316, 360/319; 29/603.01, 603.07, 603.09, 603.16; 451/5, 8, 9, 11
See application file for complete search history.

(56) References Cited

U.S. PATENT DOCUMENTS

| | | | |
|---|---|---|---|
| 5,404,635 A | 4/1995 | Das | |
| 5,911,455 A * | 6/1999 | Draaisma et al. | 29/603.07 |
| 6,007,405 A * | 12/1999 | Mei | 451/5 |
| 6,219,205 B1 * | 4/2001 | Yuan et al. | 360/319 |
| 6,347,975 B2 | 2/2002 | Ishizaki et al. | |
| 6,370,763 B1 | 4/2002 | Watanuki et al. | |
| 6,419,552 B2 | 7/2002 | Katoh et al. | |
| 6,732,421 B2 | 5/2004 | Gates et al. | |
| 6,935,923 B2 * | 8/2005 | Burbank et al. | 451/5 |
| 6,997,784 B2 * | 2/2006 | Bunch et al. | 451/41 |
| 7,014,530 B2 * | 3/2006 | Kasiraj et al. | 451/8 |
| 7,062,838 B2 * | 6/2006 | Ding et al. | 29/603.12 |
| 2006/0064866 A1 * | 3/2006 | Cyrille et al. | 29/603.15 |
| 2006/0068685 A1 * | 3/2006 | Cyrille et al. | 451/8 |

* cited by examiner

*Primary Examiner*—Allen Cao
(74) *Attorney, Agent, or Firm*—Bracewell & Giuliani LLP

(57) ABSTRACT

Magnetic sensors are fabricated with an initial length that is slightly longer than their finished length. The sensors are then critically lapped and exposed for target signal output. The final target length of the sensors is obtained by first exposing the sensors to a photolithographic process and then directly lapping the excess length from the sensors. The length of sensor material that is removed is in the range of several nanometers. The target end point during lapping may be ascertained by detecting the change in resistance between the sensor and leads in the lapping tool as the excess material is lapped from the sensor.

21 Claims, 3 Drawing Sheets

CRITICALLY EXPOSED LAPPING OF MAGNETIC SENSORS FOR TARGET SIGNAL OUTPUT

BACKGROUND OF THE INVENTION

1. Technical Field

The present invention relates in general to fabricating magnetic sensors and, in particular, to an improved system, method, and apparatus for critically exposed lapping of magnetic sensors for target signal output.

2. Description of the Related Art

Magnetic recording is employed for large memory capacity requirements in high speed data processing systems. For example, in magnetic disc drive systems, data is read from and written to magnetic recording media utilizing magnetic transducers commonly referred to as magnetic heads. Typically, one or more magnetic recording discs are mounted on a spindle such that the disc can rotate to permit the magnetic head mounted on a moveable arm in position closely adjacent to the disc surface to read or write information thereon.

During operation of the disc drive system, an actuator mechanism moves the magnetic transducer to a desired radial position on the surface of the rotating disc where the head electromagnetically reads or writes data. Usually the head is integrally mounted in a carrier or support referred to as a "slider." A slider generally serves to mechanically support the head and any electrical connections between the head and the rest of the disc drive system. The slider is aerodynamically shaped to slide over moving air and therefore to maintain a uniform distance from the surface of the rotating disc thereby preventing the head from undesirably contacting the disc.

Typically, a slider is formed with essentially planar areas surrounded by recessed areas etched back from the original surface. The surface of the planar areas that glide over the disc surface during operation is known as the air bearing surface (ABS). Large numbers of sliders are fabricated from a single wafer having rows of the magnetic transducers deposited simultaneously on the wafer surface using semiconductor-type process methods. After deposition of the heads is complete, single-row bars are sliced from the wafer, each bar comprising a row of units which can be further processed into sliders having one or more magnetic transducers on their end faces. Each row bar is bonded to a fixture or tool where the bar is processed and then further diced, i.e., separated into sliders having one or more magnetic transducers on their end faces. Each row bar is bonded to a fixture or tool where the bar is processed and then further diced, i.e., separated into individual sliders each slider having at least one magnetic head terminating at the slider air bearing surface.

The magnetic head is typically an inductive electromagnetic device including magnetic pole pieces, which read the data from or write the data onto the recording media surface. In other applications the magnetic head may include a magneto resistive read element for separately reading the recorded data with the inductive heads serving only to write the data. In either application, the various elements terminate on the air bearing surface and function to electromagnetically interact with the data contained on the magnetic recording disc.

In order to achieve maximum efficiency from the magnetic heads, the sensing elements must have precision dimensional relationships to each other as well as the application of the slider ABS to the magnetic recording disc. Each head has a polished ABS with flatness parameters, such as crown, camber, and twist. The ABS allows the head to "fly" above the surface of its respective spinning disk. In order to achieve the desired fly height, fly height variance, take-off speed, and other aerodynamic characteristics, the flatness parameters of the ABS need to be tightly controlled. During manufacturing, it is most critical to grind or lap these elements to very close tolerances of desired flatness in order to achieve the unimpaired functionality required of sliders.

Conventional lapping processes utilize either oscillatory or rotary motion of the workpiece across either a rotating or oscillating lapping plate to provide a random motion of the workpiece over the lapping plate and randomize plate imperfections across the head surface in the course of lapping. During the lapping process, the motion of abrasive particles carried on the surface of the lapping plate is typically along, parallel to, or across the magnetic head elements exposed at the slider ABS.

Rotating lapping plates having horizontal lapping surfaces in which abrasive particles such as diamond fragments are embedded have been used for lapping and polishing purposes in the high precision lapping of magnetic transducer heads. Generally in these lapping processes, as abrasive slurry utilizing a liquid carrier containing diamond fragments or other abrasive particles is applied to the lapping surface as the lapping plate is rotated relative to the slider or sliders maintained against the lapping surface.

Although a number of processing steps are required to manufacture heads, the ABS flatness parameters are primarily determined during the final lapping process. The final lapping process may be performed on the heads after they have been separated or segmented into individual pieces, or on rows of heads prior to the segmentation step. This process requires the head or row to be restrained while an abrasive plate of specified curvature is rubbed against it. As the plate abrades the surface of the head, the abrasion process causes material removal on the head ABS and, in the optimum case, will cause the ABS to conform to the contour or curvature of the plate. The final lapping process also creates and defines the proper magnetic read sensor element heights needed for magnetic recording.

In magnetic head applications, the magnetically active components exposed at the ABS are made of relatively softer, ductile materials. These magnetically active components during lapping can be scratched and smeared to the other components causing electrical shorts and degraded head performance. Traditionally, the potential damage done by lapping-induced stress has been mitigated by using the smallest possible abrasives, such as 0.125 micrometer in size. Another proposal to minimize lapping-induced damage is to offset the read element from the ABS surface so that the lapping components do not contact or stress the sensors. In some cases, the read elements are offset from the ABS surface by a distance in the range of 50 to 125 nm. Unfortunately, such large distances between the sensor and the magnetic surface cause unacceptable signal loss in modern read sensors. Thus, an improved solution for mitigating the damage done by lapping-induced stress is needed.

SUMMARY OF THE INVENTION

In one embodiment of a system, method, and apparatus for critically exposed lapping of magnetic sensors for target signal output, the sensors are fabricated with an initial length that is slightly longer than their target length. The sensors are directly lapped to their final target length by first exposing the sensors and then lapping an additional small portion of the sensors (e.g., a portion of their excess length). The additional length of sensor material that is removed is in the range of approximately several nanometers (e.g., less than 10 nm).

One embodiment of a method constructed in accordance with the present invention comprises lithographically pre-forming a sensor with a desired geometry. An in-line lapping guide is included in the design, along with a cavity between the guide and the sensor. Bow control lapping (BCL) is used to lap close to the cavity formed in the structure. A fine lapping step is used to reach a resistance target that is slightly higher than the lead-to-lead resistance when the cavity is exposed.

By monitoring the total resistance between the structure leads during lapping, it is possible to detect in-situ the exposure of cavity and sensor by lapping. The former is indicated by the instance that the resistance stops increasing. The latter is signaled by a sudden increase in resistance. Between these two times the total resistance increases only slightly, no more than about 5% of the resistance when the cavity is exposed. To critically remove several nanometers of sensor material to maximize sensor output requires an additional lapping after the sensor is exposed. For example, for a sensor having a length of 125-nm, an additional 5% increase in resistance corresponds to overexposing the sensor by about 4 nm. In a sample of sensors, this effectively results in elimination of low amplitude sensors, and an increase in higher mean amplitude sensors with no worse amplitude spread.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
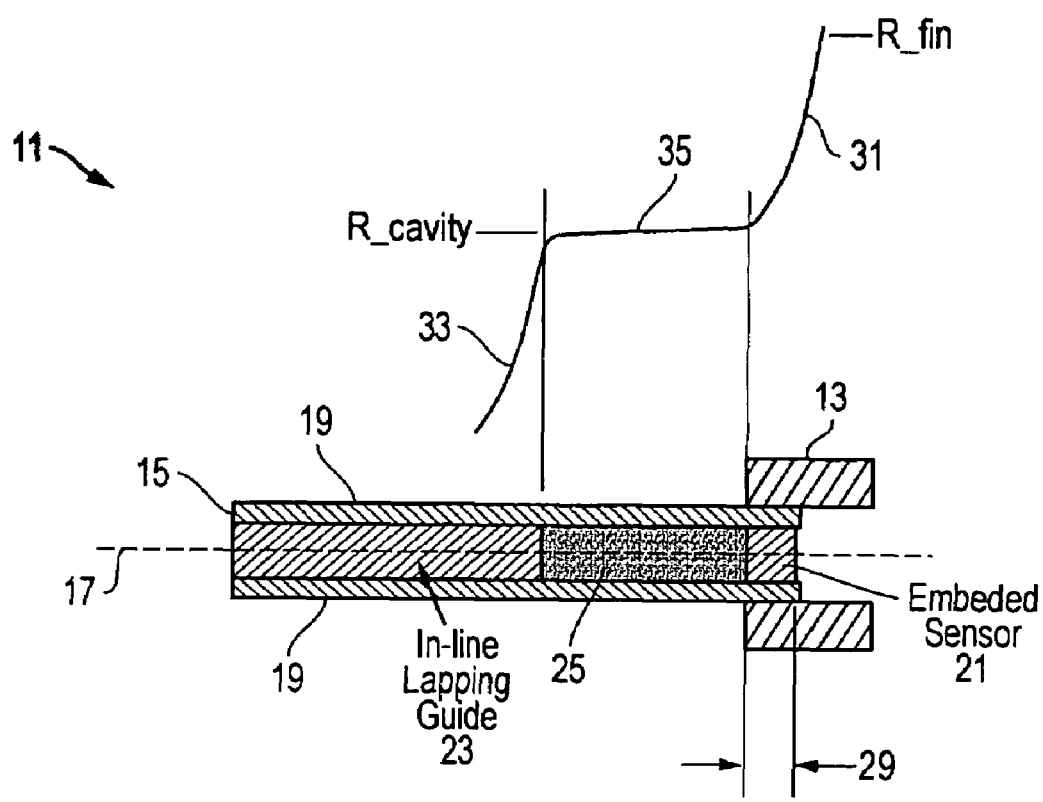
FIG. 1 is a top view of one embodiment of a structure constructed in accordance with the present invention and is shown prior to lapping.
Figure 2:
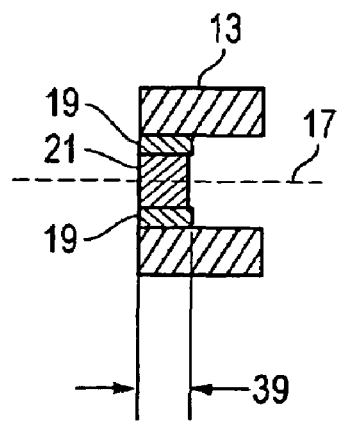
FIG. 2 is a top view of the structure of FIG. 1, but is shown after lapping.

Referring to FIGS. 1–5, one embodiment of a system, method, and apparatus for critically exposed lapping of sensors for improved signal output is disclosed. The present invention comprises a structure 11 (FIG. 1) having a proximal end 13, a distal end 15, and an axis 17 extending therebetween to define an axial direction. A pair of electrical leads 19 extends in the axial direction from the proximal end 13 to the distal end 15.

A sensor 21 is embedded in the structure 11 on the proximal end 13 between the electrical leads 19. In one embodiment, the sensor 21 is lithographically formed. An in-line lapping guide 23 formed in the structure 11 adjacent the distal end 15 between the electrical leads 19 and extending in the axial direction. A cavity 25 is located between the sensor 21 and the in-line lapping guide 23 and also extends in the axial direction. The cavity 25 is filled with a dielectric material.

As shown in the upper portion of FIG. 1, the sensor 21 and the in-line lapping guide 23 each have an electrical resistance 31, 33, respectively, that increases when lapped in the axial direction. The resistance 35 of the cavity material 25 also increases when lapped, but the resistance of the sensor 21 is low enough such that the resistance detected across the leads 19 (i.e., from both cavity material 25 and sensor 21) does not appreciably change as the cavity material 25 is lapped prior to penetration of sensor 21. When the in-line lapping guide 23 is lapped, the lead-to-lead resistance is the combined resistance of the in-line lapping guide 23 and the sensor 21. When the cavity 25 is exposed, as the in-line lapping guide 23 is completely removed by lapping, the lead-to-lead resistance is that of the sensor 21 only, which stays constant when lapped in the axial direction. The electrical resistance 35 when sensor 21 is exposed, is thereafter called the cavity resistance. In one embodiment, the cavity resistance is detected, and the sensor 21 is further lapped for an additional percentage of the cavity resistance.

Figure 3:
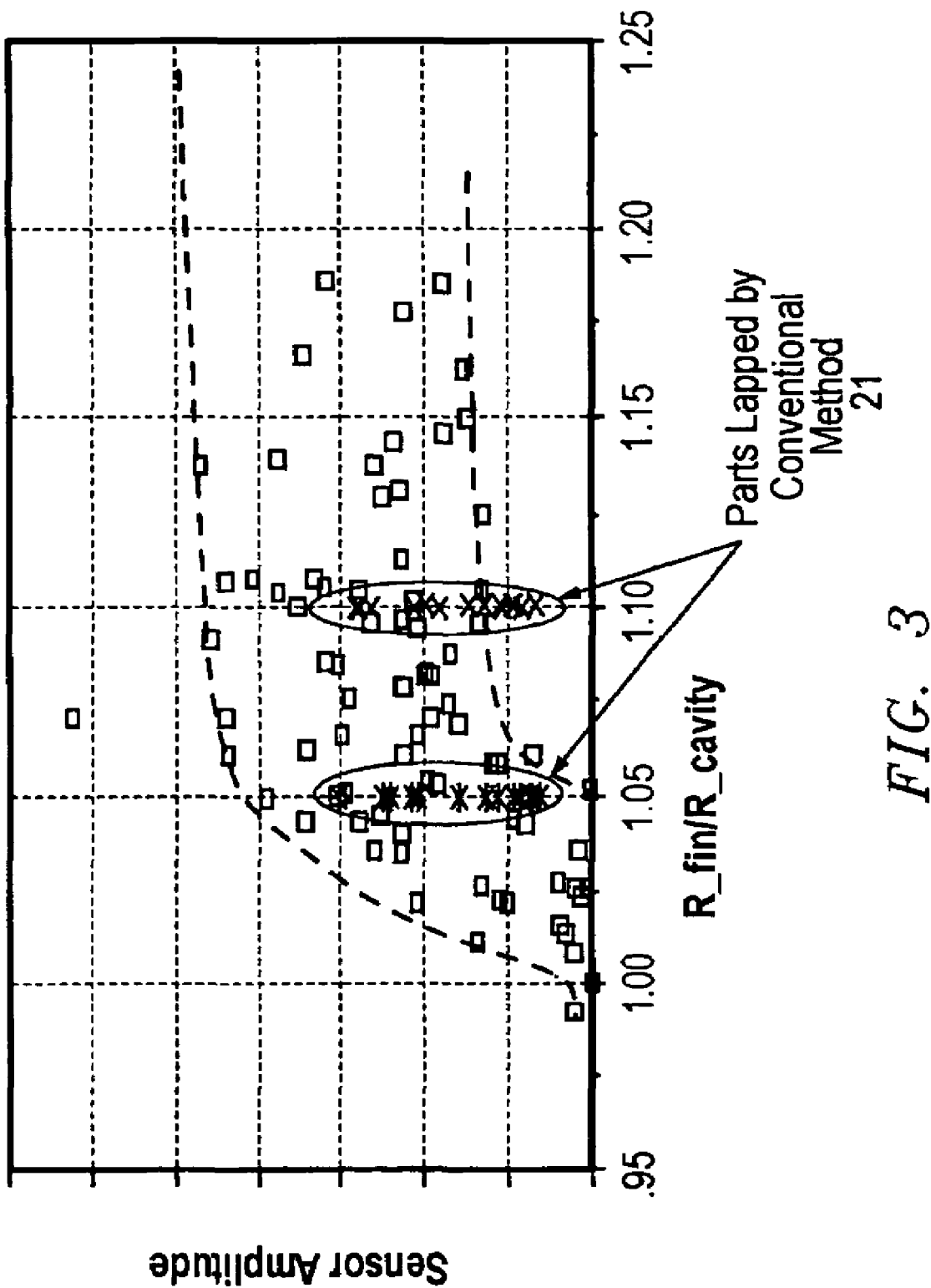
FIG. 3 is a plot of the performance of a sample of the structures of FIG. 1.

For example, as shown in FIG. 3, the sensor 21 may be lapped until a small increase (e.g., 5%, or greater, depending on sensor length, etc.) in electrical resistance over the electrical resistance 35 of the cavity material 25 is attained (see, horizontal axis at 1.0 to 1.1). After lapping, this corresponds to a removal of less than approximately 6 nm of the material that forms the sensor 21, in one embodiment. Thus, the sensor 21 is fabricated with an initial length 29 (FIG. 1) in the axial direction that is longer than an operating, after-lapped length 39 (FIG. 2) of the sensor 21. In one version, the in-line lapping guide 23 and a portion of the cavity material 25 are coarse lapped (e.g., bow control lapped), and a remainder of the cavity material 25 and the sensor 21 are fine lapped.

Figure 4:
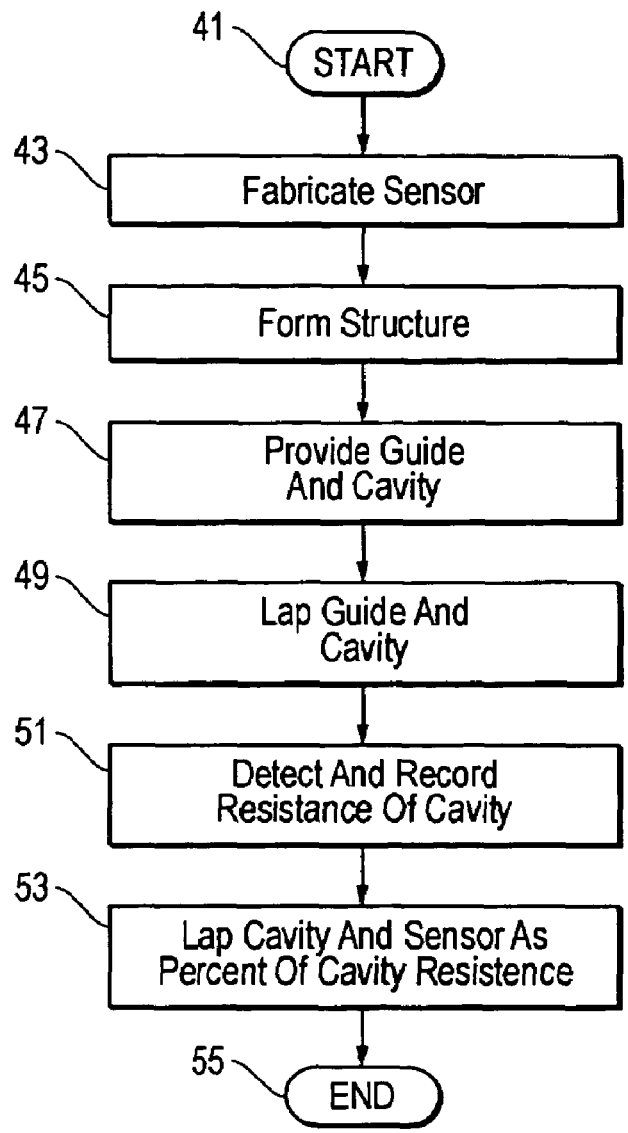
FIG. 4 is a flowchart of one embodiment of a method constructed in accordance with the present invention.

Referring now to FIG. 4, the present invention also comprises a method of critically exposed lapping of sensors, such as magnetic sensors, for improved and even target signal output. The method begins as indicated at step 41, and comprises fabricating a sensor 21 (step 43) having an axial direction 17 (e.g., a path direction or magnetic path direction), and an initial length 29 extending in the magnetic path direction 17 that is longer than an operating length 39 (FIG. 2) of the sensor 21.

As indicated at step 45, the method also comprises forming the sensor 21 in a structure 11 (such as by lithographically pre-forming the sensor 21 and the structure 11) having conductive leads 19 that extend in the magnetic path direction 17 from the sensor 21, providing an in-line lapping guide 23 (step 47) in the structure 11 that extends in the magnetic path direction 17, and a cavity material 25 between the in-line lapping guide 23 and the sensor 21 such that the sensor 21 is embedded in the structure 11.

As illustrated at step 49, the method further comprises coarse lapping (e.g., bow control lapping) the in-line lapping guide 23 and then the cavity material 25 in the magnetic path direction 17 and, as depicted at step 51, detecting or monitoring an electrical resistance 35 of the cavity material 25 in-situ via the conductive leads 19. In the next step 53, the cavity material 25 is lapped (e.g., fine lapped) and then the sensor 21 in the magnetic path direction 17 such that the initial length 29 of the sensor 21 is reduced to approximately the operating length 39 of the sensor 21 by detecting a change in electrical resistance in-situ as the sensor 21 is lapped. For example, this may comprise detecting a small increase in electrical resistance over an electrical resistance 35 of the cavity material 25, which may comprise lapping less than approximately 10 nm from the sensor 21. The method ends as indicated at step 55.

Figure 5:
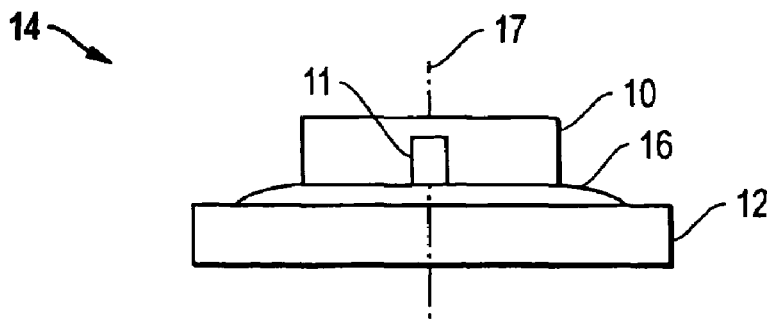
FIG. 5 is a schematic diagram of a lapping device for lapping the structure of FIG. 1 and is constructed in accordance with the present invention.

Referring now to FIG. 5, the present invention may be utilized in a lapping device 14 such as the one illustrated. Lapping device 14 includes a lapping instrument 12 that laps a workpiece 10 containing or supporting the previously described structure 11 with an optional lubricant, slurry, or other solution 16.

While the invention has been shown or described in only some of its forms, it should be apparent to those skilled in the art that it is not so limited, but is susceptible to various changes without departing from the scope of the invention.

What is claimed is:

1. A method of critically exposed lapping of sensors for improved signal output, the method comprising:
   (a) fabricating a sensor with an axial direction, and an initial length extending in the axial direction that is longer than an operating length of the sensor;
   (b) forming the sensor in a structure having conductive leads that extend in the axial direction from the sensor;
   (c) providing an in-line lapping guide in the structure that extends in the axial direction, and a cavity material between the in-line lapping guide and the sensor such that the sensor is embedded in the structure;
   (d) lapping the in-line lapping guide and then the cavity material in the axial direction and monitoring an electrical resistance of the structure via the conductive leads;
   (e) lapping the cavity material and the sensor in the axial direction such that the initial length of the sensor is reduced to approximately the operating length of the sensor by detecting a change in electrical resistance as the sensor is lapped.

2. The method of claim 1, wherein steps (a) and (b) comprise lithographically pre-forming the sensor and the structure.

3. The method of claim 1, wherein step (d) comprises bow control lapping.

4. The method of claim 1, wherein step (e) comprises fine lapping.

5. The method of claim 1, wherein step (e) comprises detecting a 5% or greater increase in electrical resistance over an electrical resistance when the cavity is exposed.

6. The method of claim 1, wherein step (e) comprises lapping less than 10 nm from the sensor.

7. The method of claim 1, wherein the in-line lapping guide, the material in the cavity, and the sensor each have an electrical resistance that increases when lapped.

8. A method of critically exposed lapping of magnetic sensors for target signal output, the method comprising:
   (a) fabricating a sensor with a magnetic path direction, and an initial length extending in the magnetic path direction that is longer than an operating length of the sensor;
   (b) forming the sensor in a structure having conductive leads that extend in the magnetic path direction from the sensor;
   (c) providing an in-line lapping guide in the structure that extends in the magnetic path direction, and a cavity material between the in-line lapping guide and the sensor such that the sensor is embedded in the structure;
   (d) coarse lapping the in-line lapping guide and then the cavity material in the magnetic path direction and monitoring an electrical resistance of the structure in-situ via the conductive leads;
   (e) fine lapping the cavity material and the sensor in the magnetic path direction such that the initial length of the sensor is reduced to approximately the operating length of the sensor by detecting a change in electrical resistance in-situ as the sensor is lapped.

9. The method of claim 8, wherein steps (a) and (b) comprise lithographically pre-forming the sensor and the structure.

10. The method of claim 8, wherein step (d) comprises bow control lapping.

11. The method of claim 8, wherein step (e) comprises detecting a 5% or greater increase in electrical resistance over an electrical resistance when the cavity is exposed.

12. The method of claim 8, wherein step (e) comprises lapping less than 10 nm from the sensor.

13. The method of claim 8, wherein the in-line lapping guide, the material in the cavity, and the sensor each have an electrical resistance that increases when lapped.

14. A system for critically exposed lapping of a sensor for target signal output, the system comprising:
   a structure having a proximal end, a distal end, and an axis extending therebetween to define an axial direction;
   a pair of electrical leads extending in the axial direction from the proximal end to the distal end;
   a sensor embedded in the structure on the proximal end between the electrical leads;
   an in-line lapping guide mounted to the structure adjacent the distal end between the electrical leads and extending in the axial direction;
   a cavity located between the sensor and the in-line lapping guide and extending in the axial direction, the cavity being filled with a material; and the system further comprising:
   lapping the in-line lapping guide, the cavity material, and the sensor in the axial direction.

15. The system of claim 14, wherein the in-line lapping guide, the cavity, and the sensor each have an electrical resistance that increases when lapped.

16. The system of claim 14, wherein the sensor is fabricated with an initial length in the axial direction that is longer than an operating, after-lapped length of the sensor.

17. The system of claim 14, wherein the in-line lapping guide and a portion of the cavity material are coarse lapped, and a remainder of the cavity material and the sensor are fine lapped.

18. The system of claim 17, wherein the in-line lapping guide and the portion of the cavity material are bow control lapped.

19. The system of claim 14, wherein an electrical resistance of the cavity material is detected, and the sensor is lapped until a percentage of the electrical resistance of the cavity material is attained.

20. The system of claim 19, wherein the sensor is lapped until a 5% or greater increase in electrical resistance over the electrical resistance of the cavity material is attained.

21. The system of claim 19, wherein less than 10 nm of the sensor is lapped.

* * * * *